US009838151B1

(12) United States Patent
Stockmaster

(10) Patent No.: US 9,838,151 B1
(45) Date of Patent: Dec. 5, 2017

(54) WAVELET TRANSFORMATION BASED ANTI-JAM PROCESSING TECHNIQUES

(71) Applicant: Michael H. Stockmaster, Cedar Rapids, IA (US)

(72) Inventor: Michael H. Stockmaster, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 332 days.

(21) Appl. No.: 14/636,292

(22) Filed: Mar. 3, 2015

(51) Int. Cl.
*H04B 7/10* (2017.01)
*H04K 3/00* (2006.01)

(52) U.S. Cl.
CPC ................. *H04K 3/22* (2013.01); *H04K 3/25* (2013.01)

(58) Field of Classification Search
CPC .................................. H04K 3/25; H04K 3/22
USPC .......................................................... 342/16
See application file for complete search history.

(56) References Cited

U.S. PATENT DOCUMENTS 7,778,367 B1 * 8/2010 Stockmaster ......... G01S 5/0215 375/240.19

* cited by examiner

*Primary Examiner* — Timothy A Brainard
(74) *Attorney, Agent, or Firm* — Angel N. Gerdzhikov; Donna P. Suchy; Daniel M. Barbieri

(57) ABSTRACT

Wavelet transformation based anti-jam processing methods and systems are disclosed. An anti-jam processing method may include: generating a wavelet transformation for a unit of a received signal; weighting each element in the wavelet transformation to generate a weighted wavelet transformation; evaluating jammer suppression performances of a plurality of time and frequency resolution levels defined for an inverse wavelet transformation; selecting a particular time and frequency resolution level among the plurality of time and frequency resolution levels; and applying the inverse wavelet transformation to the weighted wavelet transformation, wherein the inverse wavelet transformation is applied based on the particular time and frequency resolution level selected.

20 Claims, 4 Drawing Sheets

WAVELET TRANSFORMATION BASED ANTI-JAM PROCESSING TECHNIQUES

BACKGROUND

Jamming refers to intentional emissions of energy to interfere with operations of a communication device by decreasing its signal-to-noise ratio or saturating its receiver with noise or false information. Anti-jamming refers to techniques utilized to mitigate effects of jamming. Various anti-jamming techniques have been developed to provide protections against jamming. For example, techniques such as frequency excision and the like are commonly utilized to mitigate effects of jamming. A challenge in frequency excision is not only to identify which energy is a candidate for excision, but also to control the excision process in order to minimize effects on desired signals.

Traditional anti-jamming techniques generally rely on Fourier transformations or finite impulse response (FIR) filters. Typically, received signal samples are processed in units referred to as blocks or observation intervals, wherein each block is essentially a collection of samples to be processed in aggregate. It is noted, however, if the frequency of a jamming signal changes or if its amplitude pulses over the course of anti-jam processing, the effectiveness of the traditional Fourier transformations or FIR filters based anti-jam processing techniques may be compromised. For example, if the frequency of a jamming signal changes (e.g., the jamming signal may sweep across a frequency band), the bandwidth of the jamming signal may appear to be greater than it really is due to the limitations of the fixed block/observation interval. Similarly, if a jamming signal is pulsed on and off, an anti-jam processor may be forced to assume that a jamming signal is present during the entire observation interval. Therefore, traditional means of implementing frequency excisions may be ineffective against these types of agile jammers (e.g., pulsed and/or swept jammers) for a large range of relevant pulse and sweep rates. For example, even if anti-jam processing can be tuned for a short range of rates, the performance still suffers in some other aspect (e.g., lack high time resolution to address a scenario of many continuous wave jammers).

Wavelet transformation based anti-jam techniques described in: Method and Apparatus for Receiving a Geo-Location Signal, U.S. Pat. No. 7,778,367, which is herein incorporated by reference in its entirety, implement wavelet transformations instead of Fourier transformations or finite impulse response (FIR) filters based excisions. As described in U.S. Pat. No. 7,778,367, a particular jamming signal may be mitigated by performing spatial processing in time-frequency bins in a wavelet transformation. More specifically, once a unit of signal sample is obtained, a wavelet transformation may be applied to the unit of signal sample. It is noted that in contrast to traditional anti-jamming techniques which relied on a Fourier transformation, a wavelet transformation is generally accomplished according to a basis function. Where a Fourier transform generates a frequency domain rendition of a signal, a wavelet transformation generates a scale vs. time-interval rendition of a signal. In the wavelet domain, there is a known inverse relationship between the notion of scale and frequency. Herein we will use the term frequency with the understanding that the inverse relationship exists without loss of generality with respect to the wavelet transformation. As such, a particular transformation may, according to one example, define a particular number of frequencies over a particular period of time. Yet another example of a transformation may convert a time domain rendition of a signal into a frequency vs. time-interval rendition of a signal, wherein a particular frequency may span a different time-interval than a different frequency. With such control over the wavelet transformation, a jamming signal that occupies a particular band over a particular interval of time can be anticipated and mitigated.

SUMMARY

Embodiments of the inventive concepts disclosed herein are directed to a method. The method may include: generating a wavelet transformation for a unit of a received signal; weighting each element in the wavelet transformation to generate a weighted wavelet transformation; evaluating jammer suppression performances of a plurality of time and frequency resolution levels defined for an inverse wavelet transformation; selecting a particular time and frequency resolution level among the plurality of time and frequency resolution levels; and applying the inverse wavelet transformation to the weighted wavelet transformation, wherein the inverse wavelet transformation is applied based on the particular time and frequency resolution level selected.

In one aspect, the inventive concepts disclosed herein are directed to an apparatus. The apparatus may include a wavelet transformation unit configured to generate a wavelet transformation for a unit of a received signal and a weighting unit configured to weight each element in the wavelet transformation to generate a weighted wavelet transformation. The apparatus may also include a performance evaluator configured to evaluate jammer suppression performances of a plurality of time and frequency resolution levels defined for an inverse wavelet transformation. The performance evaluator may be further configured to select a particular time and frequency resolution level among the plurality of time and frequency resolution levels. The apparatus may further include an inverse wavelet transformation unit configured to apply the inverse wavelet transformation to the weighted wavelet transformation, wherein the inverse wavelet transformation is applied based on the particular time and frequency resolution level selected by the performance evaluator.

A further embodiment of the present disclosure is directed to a system. The system may include at least one receiver configured to receive a signal, wherein the signal may include a data signal in a presence of a jamming signal. The system may also include an anti-jamming processor in communication with the at least one receiver for mitigating effects of the jamming signal on the data signal. The anti-jamming processor may be configured to: generate a wavelet transformation for a unit of the signal received by the at least one receiver; weight each element in the wavelet transformation to generate a weighted wavelet transformation; evaluate jammer suppression performances of a plurality of time and frequency resolution levels defined for an inverse wavelet transformation; select a particular time and frequency resolution level among the plurality of time and frequency resolution levels; and apply the inverse wavelet transformation to the weighted wavelet transformation, wherein the inverse wavelet transformation is applied based on the particular time and frequency resolution level selected.

It is to be understood that both the foregoing general description and the following detailed description are exemplary and explanatory only and are not restrictive of the inventive concepts disclosed and claimed herein. The accompanying drawings, which are incorporated in and constitute a part of the specification, illustrate embodiments of the inventive concepts and together with the general description, serve to explain the principles and features of the inventive concepts disclosed herein.

BRIEF DESCRIPTION OF THE DRAWINGS

The numerous objects and advantages of the inventive concepts disclosed herein may be better understood by those skilled in the art by reference to the accompanying figures in which.

DETAILED DESCRIPTION

Reference will now be made in detail to exemplary embodiments of the inventive concepts disclosed herein, examples of which are illustrated in the accompanying drawings.

Figure 1:
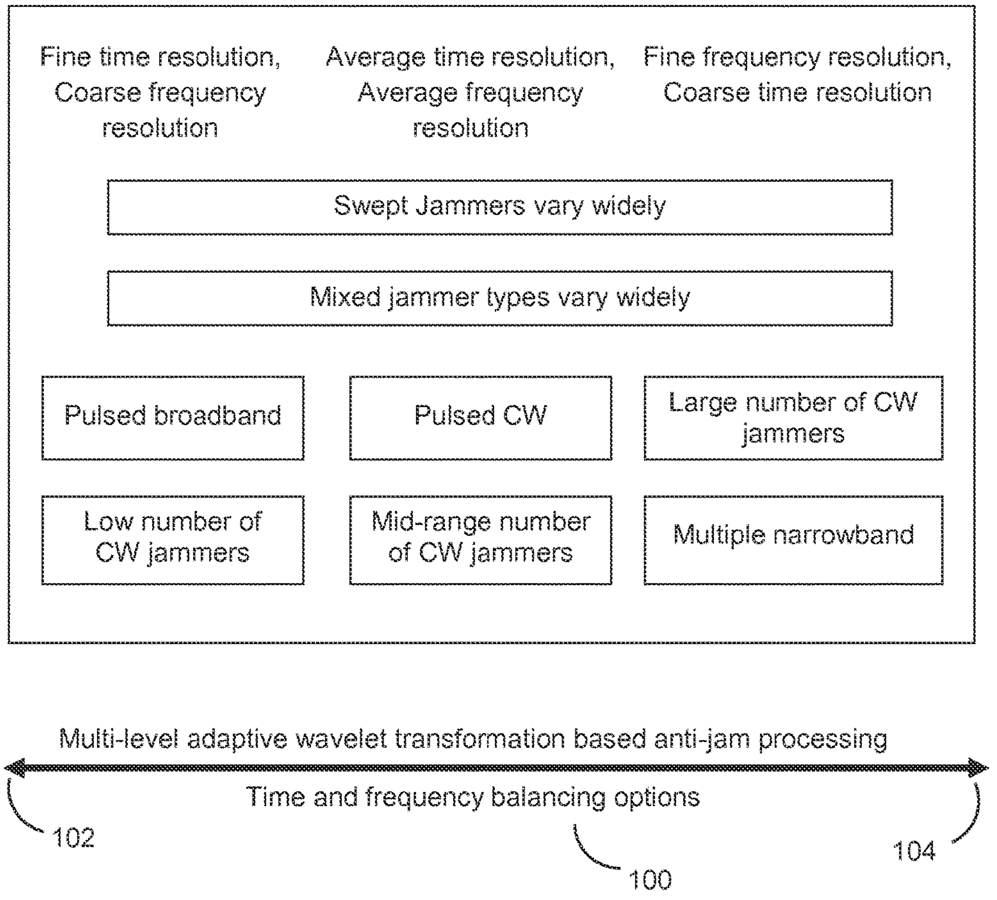
FIG. 1 is an illustration depicting effectiveness of various levels of balance between time and frequency in a wavelet transformation based anti-jam process for addressing various types of jammers.

Wavelet transformation based anti-jam techniques, such as the techniques described in: Method and Apparatus for Receiving a Geo-Location Signal, U.S. Pat. No. 7,778,367, are effective against a jamming signal that occupies a particular band over a particular interval of time. It is noted, however, that different types of jammers may require different levels of balance between time and frequency in a wavelet transformation. FIG. 1 is a simplified depiction showing effectiveness of various levels of balance between time and frequency in a wavelet transformation based anti-jam process for addressing various types of jammers. For example, if finely defined time bins (i.e., fine time resolution) and coarsely defined frequency bins (i.e., coarse frequency resolution) are used, the wavelet transformation based anti-jam process may be very effective against a low number of continuous wave (CW) jammers or pulsed broadband jammers, but relatively ineffective against a large number of CW jammers or multiple narrowband jammers. On the other hand, if finely defined frequency bins (i.e., fine frequency resolution) and coarsely defined time bins (i.e., coarse time resolution) are used, the wavelet transformation based anti-jam process may be very effective against a large number of CW jammers or multiple narrowband jammers, but relatively ineffective against pulsed broadband jammers. Furthermore, it is noted that behaviors of certain types of jammers (e.g., swept jammers, mixed jammers, or other types of agile jammers) may vary widely, making them difficult to protect against if the balance between time and frequency resolutions used in the wavelet transformation remain fixed.

It is therefore beneficial to provide abilities to change time/frequency resolution parameters and to adaptively select a balance 100 between time and frequency in a wavelet transformation based anti-jam process that best addresses a changing threat environment. In some embodiments in accordance with the inventive concepts disclosed herein, different options for balancing time and frequency, e.g., ranging from fine time resolution but coarse frequency resolution 102 to fine frequency resolution but coarse time resolution 104, may be considered for a given block of anti-jam processing. The best balancing option, among the plurality of options considered, may be adaptively selected, and anti-jam processing for the given block may then be performed based on the selected balancing option. This process may then be repeated and carried out on a block-by-block basis.

Figure 2:
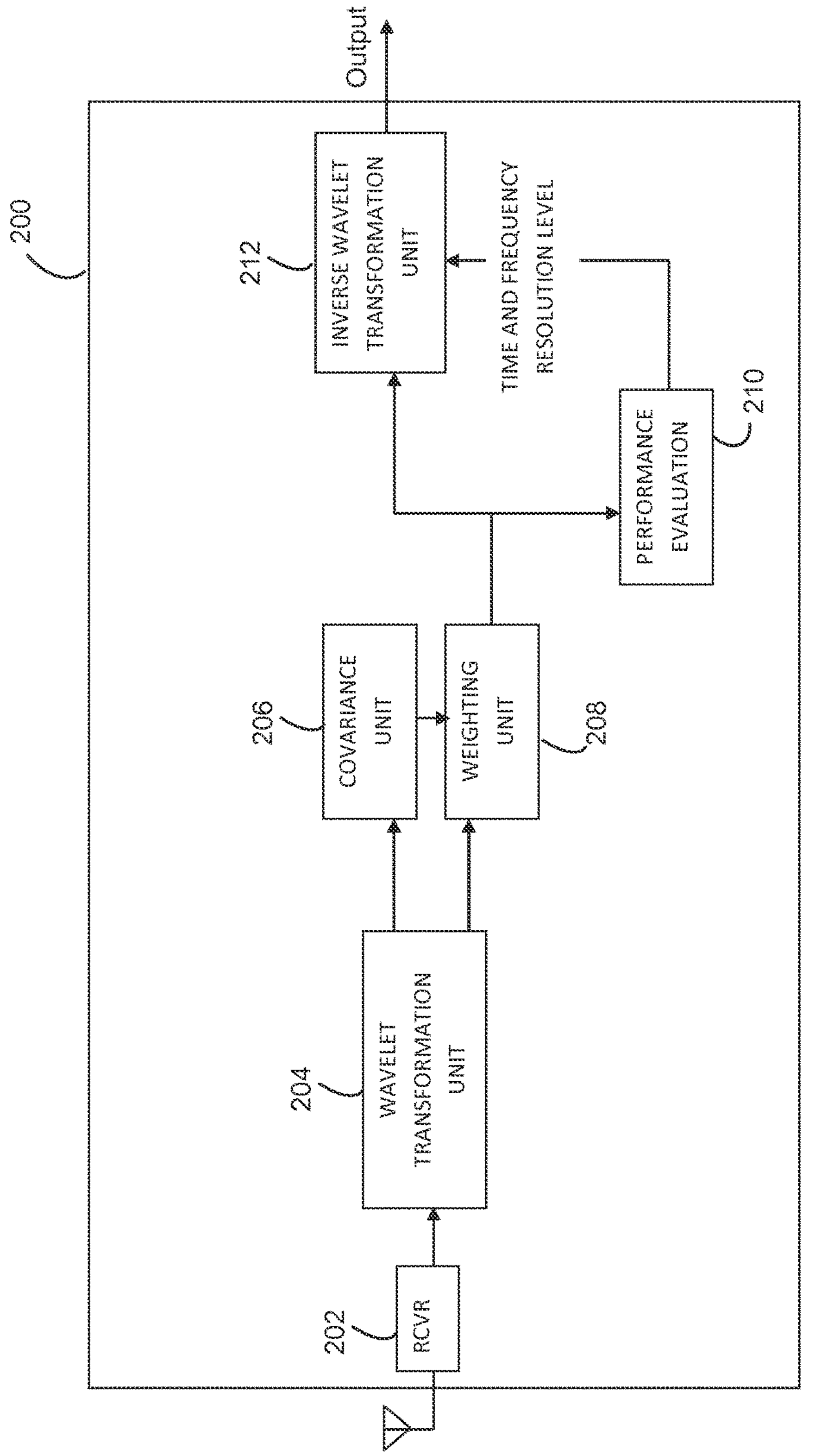
FIG. 2 is a block diagram depicting an embodiment of a system implementing a multi-level adaptive wavelet transformation based anti-jam method.
Figure 3:
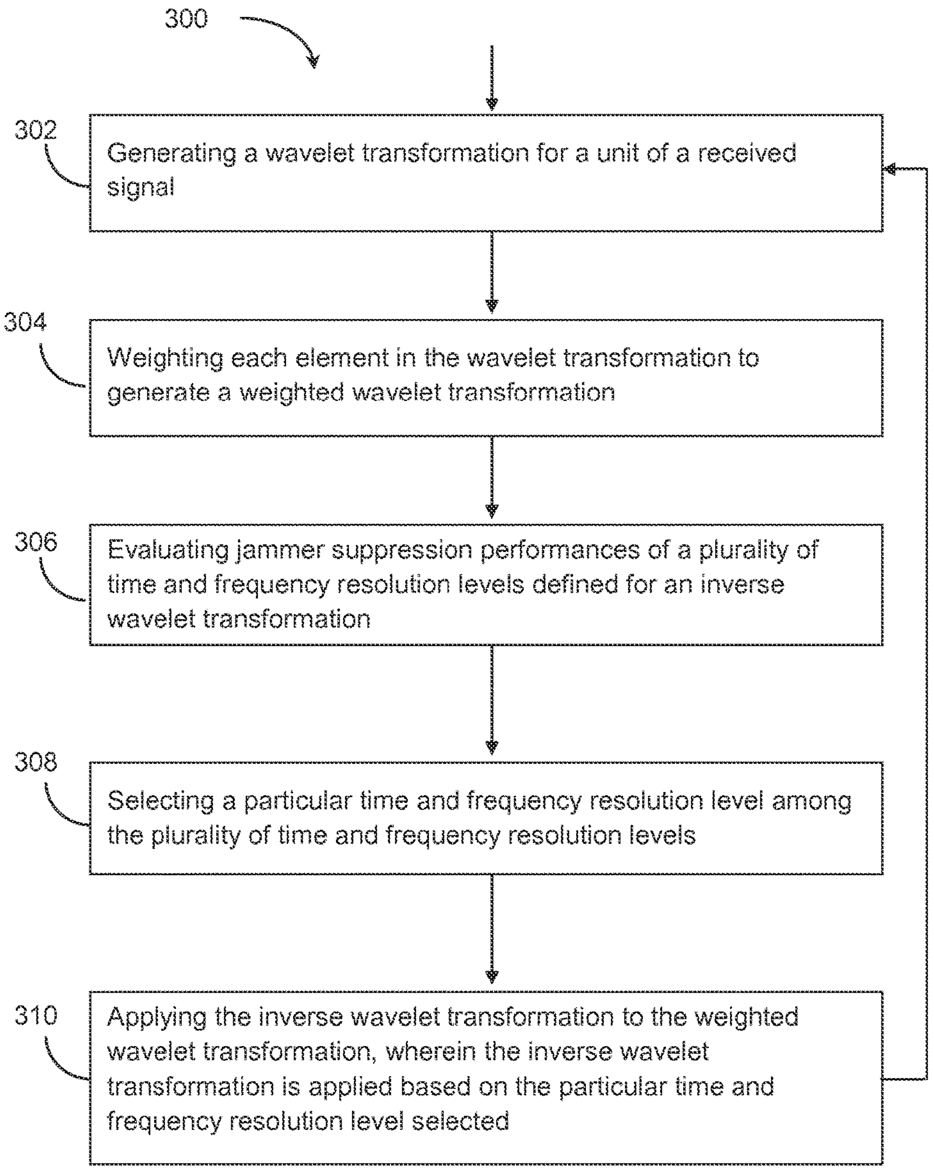
FIG. 3 is a flow diagram depicting an embodiment of the multi-level adaptive wavelet transformation based anti-jam method.

Referring now generally to FIGS. 2 and 3. FIG. 2 is a block diagram depicting an embodiment of a system 200 implementing a method referred to as multi-level adaptive wavelet transformation based anti-jam processing, and FIG. 3 is a flow diagram depicting an embodiment of the method 300. As depicted in FIG. 2, upon receiving a signal at a signal receiver 202, the received signal may be provided to a wavelet transformation unit 204 for anti-jam processing.

More specifically, the wavelet transformation unit 204 may generate a wavelet transformation for the received signal in a step 302. The wavelet transformation may then be weighted in a step 304 based on weights calculated for the frequency bins in the wavelet transformation. It is noted that implementation details of wavelet transformation and weight calculation have been described in: Method and Apparatus for Receiving a Geo-Location Signal, U.S. Pat. No. 7,778,367, which is herein incorporated by reference in its entirety. In some embodiments, a covariance unit 206 may be utilized to calculate/determine a weight for each element (e.g., energy/power in each frequency bin) of the wavelet transformation, and a weighting unit 208 may then apply the calculated weight to each element of the wavelet transformation accordingly. The output of the weighting unit 208 is a weighted wavelet transformation that is ready for inverse wavelet transformation.

However, prior to performing the inverse wavelet transformation, a performance evaluator 210 is utilized to evaluate different options for balancing between time and frequency resolutions (may be referred to as different time and frequency resolution levels) in a step 306, and a particular level that offers the best jammer suppression while still preserving the desired data signal is selected in a step 308. As previously described, the different time and frequency resolution levels may range from fine time resolution but coarse frequency resolution to fine frequency resolution but coarse time resolution. The performance evaluator 210 may evaluate the jammer suppression performance of the different time and frequency resolution levels based on simple statistics such as signal-to-noise ratios, failure rates or the like, and make the selection accordingly. Subsequently, an inverse wavelet transformation unit 212 may apply inverse wavelet transformation of the weighted wavelet transformation in a step 310 utilizing the selected time and frequency resolution level.

It is contemplated that selecting among the multiple time and frequency resolution levels optimizes the inverse wavelet transformation to adapt to jammer characteristics. It is also contemplated that the method 300 may repeat again on a block-by-block basis. That is, the time and frequency resolution level utilized for inverse wavelet transformation may be dynamically selected for each block (or each unit of processing), allowing the method 300 to be adaptive to the environment and effectively providing protections against various types of jammers even as the jammer environment changes.

It is to be understood that the term "block" referenced in the example above generally refers to a collection of samples that effectively defines an observation interval of the signal environment. It is contemplated that while the examples described above may implement the adaptive selection process on a block-by-block basis, similar adaptive selection process may also be implemented within a block of anti-jam processing, allowing even more rapid/granular balancing level adjustments to be made to address a rapidly changing threat environment.

It is also to be understood that the term "wavelet transformation" referenced in the example above generally refers to various types of wavelet transformations. It is contemplated that wavelet transformations such as discrete wavelet transformations (DWT), continuous wavelet transformations (CWT), wavelet packet transformations (WPT), as well as complex versions of wavelet transformations may be utilized without departing from the broad scope of the inventive concepts disclosed herein.

It is further contemplated that when wavelet transformations are utilized, various wavelet-based signal processing techniques and/or algorithms (e.g., the best-tree wavelet packet transform compression algorithm) typically used in applications such as compression may be repurposed and utilized to identify the most relevant wavelet representation that can be used to represent a detected energy (which may represent the jammer signal). More specifically, rather than zero out bins outside of those containing the detected energy as in a compression application prior to performing the inverse transform, the detected energy bins may be zeroed out and the remaining bins may be left intact in an anti-jamming application. This process may offer better time resolution in frequency areas that can be represented at a lower frequency resolution which may further optimizes the distribution between time and frequency resolution.

It is to be understood, however, that whether to implement the adaptive selection process on a block-by-block basis or on a sub-block basis, and whether to implement any compression-based techniques for energy detection purposes, may be determined based on various factors, including, but not limited to, resource availability, processing power, assessment of the operating environment, as well as other factors without departing from the broad scope of the inventive concepts disclosed herein.

It is also noted that the multi-level adaptive wavelet transformation based anti-jam processing techniques disclosed herein provide improved anti-jamming performance over simple threshold based excision techniques. Adaptively selecting an optimal level (e.g., by choosing the best time-frequency level as previously described) prior to applying inverse transform tunes the performance to the type of jamming being experienced in real-time and is able to mitigate multiple agile jammers simultaneously. It is contemplated that the multi-level adaptive wavelet transformation based anti-jam processing techniques disclosed herein may be utilized to protect navigation signals (e.g., Global Positioning System, or GPS signals), as well as other types of signals such as communication signals or the like without departing from the broad scope of the inventive concepts disclosed herein.

Figure 4:
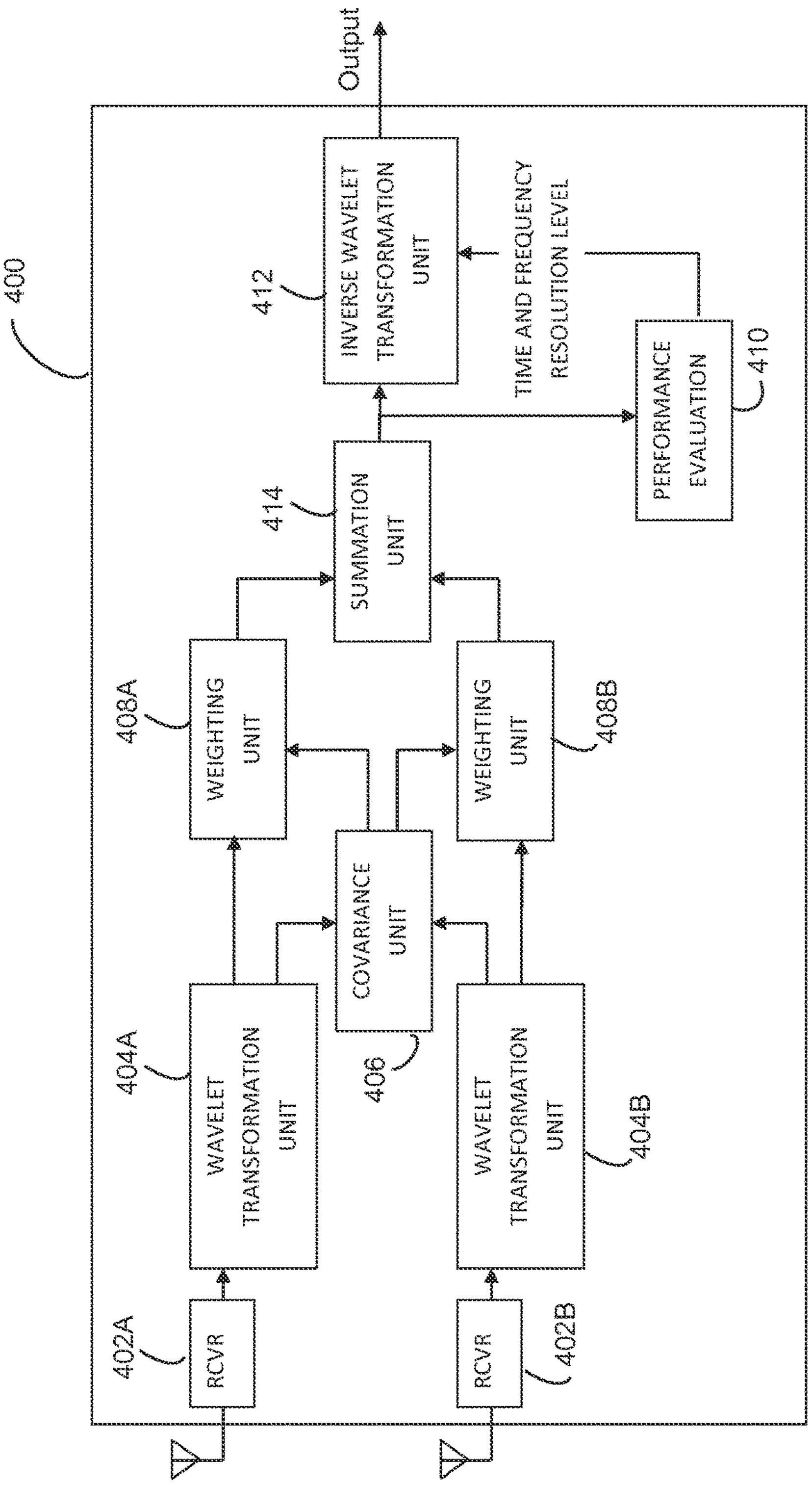
FIG. 4 is a block diagram depicting another embodiment of a system implementing the multi-level adaptive wavelet transformation based anti-jam method.

It is further contemplated that while the examples above described utilizing the multi-level adaptive wavelet transformation based anti-jam processing techniques in a system having a single receiver, the multi-level adaptive wavelet transformation based anti-jam processing techniques are applicable to systems having multiple receivers as well. Furthermore, the multi-level adaptive wavelet transformation based anti-jam processing techniques may also be utilized in conjunction with other types of anti-jam processing as well. For instance, FIG. 4 illustrates an embodiment of a system 400 utilizing the multi-level adaptive wavelet transformation based anti-jam processing techniques in conjunction with spatial processing described in: Method and Apparatus for Receiving a Geo-Location Signal, U.S. Pat. No. 7,778,367.

As illustrated in FIG. 4, the system 400 may include multiple signal receivers 402A and 402B. In operation, each signal receiver 402 may receive a particular perspective of at least one of a data signal and a jamming signal. Each signal receiver 402 may provide the received signal to its corresponding wavelet transformation unit 404, which in turn may generate a wavelet transformation according to the signal received.

Subsequently, each wavelet transformation generated by the wavelet transformation units 404A and 404B may be provided to a covariance unit 406. The covariance unit 406 may then generate a covariance matrix for each element in each wavelet transformation received from the wavelet transformation units 404A and 404B, similar to the process described in: Method and Apparatus for Receiving a Geo-Location Signal, U.S. Pat. No. 7,778,367. Each weighting unit 408 may then apply a weight to each element of a wavelet transformation that is received from a corresponding wavelet transformation unit 404. The output of the weighting units 408A and 408B may be provided to a summation unit 414, which may then perform an element by element summation of all of the weighted wavelet transformations received from the weighting units 408A and 408B. This summation results in a nulled wavelet transformation ready for inverse wavelet transformation.

However, prior to performing the inverse wavelet transformation, a performance evaluator 410 (similar to the performance evaluator 210 previously described) may be utilized to evaluate different options for balancing between time and frequency resolutions (i.e., different time and frequency resolution levels) as described above. The performance evaluator 410 may select a level that offers the best jammer suppression while still preserving the desired data signal. The selected level may be provided to an inverse wavelet transformation unit 412, which may then perform the inverse wavelet transformation on the nulled wavelet transformation provided by the summation unit 414.

It is to be understood that only two signal receivers 402A and 402B, two wavelet transformation units 404A and 404B, and two weighting units 408A and 408B are depicted in FIG. 4 for purposes of presentation simplicity. The number of the various units depicted in FIG. 4 may vary without departing from the broad scope of the inventive concepts disclosed herein. It is also to be understood that the various units listed above may be implemented as independent but communicatively connected processing units (e.g., processors), or as separated processes running on one or more shared/integrated processing units. Furthermore, it is to be understood that the specific references to geolocation systems and/or geolocation signals are merely exemplary. The systems and methods implementing the multi-level adaptive wavelet transformation based anti-jam processes may be applicable to various types of communication systems and applications without departing from the broad scope of the inventive concepts disclosed herein.

It is to be understood that the present disclosure may be conveniently implemented in forms of a software, hardware or firmware package. Such a package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is to be understood that embodiments of the inventive concepts described in the present disclosure are not limited to any underlying implementing technology. Embodiments of the inventive concepts of the present disclosure may be implemented utilizing any combination of software and hardware technology and by using a variety of technologies without departing from the broad scope of the inventive concepts or without sacrificing all of their material advantages.

It is to be understood that the specific order or hierarchy of steps in the processes disclosed is an example of exemplary approaches. It is to be understood that the specific order or hierarchy of steps in the processes may be rearranged while remaining within the broad scope of the present disclosure. The accompanying method claims present elements of the various steps in a sample order, and are not meant to be limited to the specific order or hierarchy presented.

It is believed that the inventive concepts disclosed herein and many of their attendant advantages will be understood by the foregoing description, and it will be apparent that various changes may be made in the form, construction, and arrangement of the components thereof without departing from the broad scope of the inventive concepts or without sacrificing all of their material advantages. The form herein before described being merely an explanatory embodiment thereof, it is the intention of the following claims to encompass and include such changes.

What is claimed is:

1. A method, comprising:

(a) generating, in a communication system, a wavelet transformation for a unit of a received signal, the received signal being received by a receiver block of the communication system;

(b) weighting each element in the wavelet transformation, with a covariance block, to generate and output a weighted wavelet transformation from a weighting block;

(c) evaluating, with a performance evaluator block, jammer suppression performances of a plurality of time and frequency resolution levels defined for an inverse wavelet transformation;

(d) selecting, with one or more processors, a particular time and frequency resolution level among the plurality of time and frequency resolution levels; and (e) outputting a communication signal, using the one or more processors, by applying an inverse wavelet transformation to a nulled wavelet transformation, the nulled wavelet transformation a result of summing each element of the weighted wavelet transformation, wherein the inverse wavelet transformation is applied based on the particular time and frequency resolution level selected in step (d).

2. The method of claim 1, wherein the particular time and frequency resolution level is selected to provide a best jammer suppression among the plurality of time and frequency resolution levels while still preserving a data signal in the unit of the received signal.

3. The method of claim 1, wherein the received signal is divided into a plurality of units, and wherein steps (a) through (e) are repeated for each unit of the plurality of units.

4. The method of claim 1, wherein the wavelet transformation includes at least one of: a discrete wavelet transformation, a continuous wavelet transformation, and a wavelet packet transformation.

5. The method of claim 1, wherein each of the plurality of time and frequency resolution levels represents a particular balance between a frequency resolution and a time resolution in the wavelet transformation.

6. The method of claim 1, wherein the received signal includes a navigation signal.

7. An apparatus, comprising:

a wavelet transformation block configured to generate a wavelet transformation for a unit of a received signal;

a covariance block configured to weight each element in the wavelet transformation;

a weighting block to generate and output a weighted wavelet transformation from input received from the covariance block;

a performance evaluator block configured to evaluate jammer suppression performances of a plurality of time and frequency resolution levels defined for an inverse wavelet transformation, and further configured to select a particular time and frequency resolution level among the plurality of time and frequency resolution levels; and an inverse wavelet transformation block configured to apply the inverse wavelet transformation to a nulled wavelet transformation, the nulled wavelet transformation a result of summing each element of the weighted wavelet transformation, wherein the inverse wavelet transformation is applied based on the particular time and frequency resolution level selected by the performance evaluator.

8. The apparatus of claim 7, wherein the performance evaluator block is configured to select the particular time and frequency resolution level to provide a best jammer suppression among the plurality of time and frequency resolution levels while still preserving a data signal in the unit of the received signal.

9. The apparatus of claim 7, wherein the received signal is divided into a plurality of units, and wherein the performance evaluator block is configured to adaptively select a time and frequency resolution level among the plurality of time and frequency resolution levels for each unit of the plurality of units.

10. The apparatus of claim 7, wherein the wavelet transformation block is configured to generate at least one of: a discrete wavelet transformation, a continuous wavelet transformation, and a wavelet packet transformation for the unit of the received signal.

11. The apparatus of claim 7, wherein each of the plurality of time and frequency resolution levels represents a particular balance between a frequency resolution and a time resolution in the wavelet transformation.

12. The apparatus of claim 7, wherein the apparatus is configured to provide anti-jam processing for a navigation system.

13. A system, comprising:

at least one receiver configured to receive a signal, the signal including a data signal in a presence of a jamming signal; and an anti-jamming processor in communication with the at least one receiver for mitigating effects of the jamming signal on the data signal, the anti-jamming processor configured to:

generate a wavelet transformation for a unit of the signal received by the at least one receiver;

weight each element in the wavelet transformation to generate a weighted wavelet transformation;

evaluate jammer suppression performances of a plurality of time and frequency resolution levels defined for an inverse wavelet transformation;

select a particular time and frequency resolution level among the plurality of time and frequency resolution levels; and apply the inverse wavelet transformation to a nulled wavelet transformation, the nulled wavelet transformation a result of summing each element of the weighted wavelet transformation, wherein the inverse wavelet transformation is applied based on the particular time and frequency resolution level selected.

14. The system of claim 13, wherein the anti-jamming processor selects the particular time and frequency resolution level to provide a best jammer suppression among the plurality of time and frequency resolution levels while still preserving the data signal in the unit of the signal received by the at least one receiver.

15. The system of claim 13, wherein the anti-jamming processor selects the particular time and frequency resolution level prior to apply the inverse wavelet transform to the weighted wavelet transformation.

16. The system of claim 13, wherein the signal received by the at least one receiver is divided into a plurality of units for anti-jam processing, and wherein the anti-jamming processor adaptively selects a time and frequency resolution level among the plurality of time and frequency resolution levels for each unit of the plurality of units.

17. The system of claim 13, wherein the signal received by the at least one receiver includes a navigation signal.

18. The system of claim 13, wherein the at least one receiver includes a plurality of receivers.

19. The system of claim 18, wherein the anti-jamming processor is configured to:

generate a plurality of wavelet transformations corresponding to units of signals received by the plurality of receivers;

weight each element in each wavelet transformation to generate a plurality of weighted wavelet transformations;

generate a nulled wavelet transformation by summing together corresponding weighted elements from each of the plurality of weighted wavelet transformations;

evaluate jammer suppression performances of the plurality of time and frequency resolution levels defined for the inverse wavelet transformation;

select a particular time and frequency resolution level among the plurality of time and frequency resolution levels; and apply the inverse wavelet transformation to the nulled wavelet transformation, wherein the inverse wavelet transformation is applied based on the particular time and frequency resolution level selected.

20. The system of claim 19, wherein the anti-jamming processor selects the particular time and frequency resolution level prior to apply the inverse wavelet transform to the nulled wavelet transformation.

* * * * *